Patented July 15, 1952

2,602,985

UNITED STATES PATENT OFFICE 2,602,985

PRODUCTION OF MOLDED, SOLID, POROUS BUILDING AND INSULATION BODIES

Sigismund Kienow, Bochum, Germany

No Drawing. Application April 21, 1950, Serial No. 157,405. In Germany April 22, 1949

9 Claims. (Cl. 25—156)

The present invention relates to the production of molded, solid, porous building and insulation material; and comprises a novel method of producing said bodies.

It has heretofore been proposed to produce porous building or insulation filling materials by a process in which minerals containing gas developing substances are heated to a softening temperature so that the gas developed will cause the minerals to swell and to become porous. In that process, it is contemplated that the heating will be effected in two stages, and that the material treated is to be maintained for a considerable time at the first heating stage temperature of 1,000° C. The last mentioned process is not economical, because of the prolonged firing period, and because it does not result in the production of molded bodies ready for use, but only in granular bodies having diameters of one or two centimeters, from which useful objects can be produced only through further processing.

The primary object of the present invention is to provide a novel and effective method of producing molded bodies of the type mentioned above by firing iron oxide containing silicates in refractory clay molds, and in which the porous body formed in each mold assumes the shape of the mold cavity in which it is formed. By the use of the present invention it is thus possible to produce ready-made, useful objects by a single operation process and in an economical manner. The iron oxide containing silicates which may be used with particular advantage, include glauconite, green earth, alum slate, and obsidian.

In order to obtain a desirably uniform distribution of the pore spaces in the bodies produced, the silicate material used is subjected to a fine reducing action and is homogenized as regards grain size and composition before firing. In order to prevent the body forming material from sticking to the mold in which the body is formed and to permit each mold to be reused several times, the inner wall of the mold is advantageously lined with a mixture of pure sand, e. g. drift sand, and an organic glue, such as bone glue, gelatine, collodin, glutolin, or sickle glue. To the sand and glue mixture 5 to 10% of refractory clay may be added. Alternatively the inner walls of the molds can be lined with a wash or slip of alumina hydrate. Ground refractory clay may be added to the wash or slip if necessary to insure the adherance to the mold wall of a lining 1 of 2 millimeters thickness, when the wash or slip material is first poured into and then poured out of the mold.

In accordance with the present invention the firing and swelling process may be shortened by firing the body forming material at a temperature in the transformation temperature range of 1,100° to 1,200° C., to convert some of the trivalent iron in the material into bivalent iron. In this transformation, four $Fe_3O_4 + O_2$ molecules and one $O_2$ molecule are formed from six $Fe_2O_4$ molecules. Such transformation or conversion of only a small percentage of the trivalent iron in the raw material, is sufficient to produce a product with a weight per unit of volume of from .5 to .7 gram per cubic centimeter. If the transformation or reducing action is too strong or is effected too suddenly, it results in the formation of an undesirable high percentage of bivalent iron which acts as a flux and substantially reduces the toughness of the mold contained material. In consequence, the small pore forming gas bubbles can then coalesce to form large bubbles, and result in the production of a technically useless product.

In further accordance with the invention, the firing of the molded bodies can take place in an oxidizing atmosphere. The latter is preferably one with an air excess of 30% or more. Such an air excess is also suitable when heating up the material, to oxidize the bivalent iron originally present in the raw material into trivalent iron. The firing of a clay containing iron oxide in a reducing atmosphere, results in a swelling phenomena, and the excess air or oxidizing atmosphere is recommended as a means for avoiding undesirable swelling.

By way of illustration and example it is noted that in one use of the present invention, the raw material used is glauconitic clay from Uelsener Hohenzug, county of Bentheim, which has the following composition: 66.0% $SiO_2$, 11.0% $Al_2O_3$, 14.0% $Fe_2O_3$ plus FeO, 0.6% CaO, 2.3% MgO, 6.1% $K_2O$, and which has a firing loss of 7.9%, and which is homogenized and reduced in a centrifugal mill. The homogenized and reduced mass is then poured into a refractory clay mold, the internal wall of which has a lining consisting og 70% ground refractory clay and 30% alumina hydrate. The mold and its contents are then fired in a tunnel furnace with a strongly oxidizing atmosphere for six hours at a Seger cone 8 temperature. The surface of the fired product or body thus formed, is then smoothly ground down. The molded stone thus produced has a weight per unit of volume of .6 to .7 gram per cubic centimeter, and has a crushing strength of 50 to 70 kilograms per square centimeter, and has a pore size of 1 to 2 mm.

Having now described my invention, what I claim as new and desire to secure by Letters Patent, is:

1. The process of producing solid, porous, building and insulating bodies from silicates containing iron oxide, in which the silicate material is fired in molds of fire resisting materials, and in which the body forming material fired in each mold is thereby caused to assume the shape of the mold cavity.

2. A process as specified in claim 1, in which the silicate material fired includes at least one of the silicates, glauconite, green earth, alum slate and obsidian.

3. A process as specified in claim 1, in which the silicate material fired is finely sub-divided before firing.

4. A process as specified in claim 1, in which the silicate material is homogenized in respect to grain size and composition before being fired.

5. A process as specified in claim 1, in which the firing is effected in an oxidizing atmosphere.

6. A process as specified in claim 5, in which the oxidizing atmosphere contains an air excess of not less than 30%.

7. A process as specified in claim 1 in which the firing is effected at a Seger cone 8 temperature.

8. A process as specified in claim 1 in which the material is fired at a temperature high enough to transform a portion of the trivalent iron content of the material into bivalent iron and free oxygen.

9. A solid porous body for use as a building or insulation body and consisting of silicate material including iron oxide and formed by firing said material to a softening temperature in finely sub-divided form in a refractory mold.

SIGISMUND KIENOW.

REFERENCES CITED

The following references are of record in the file of this patent:

UNITED STATES PATENTS

| Number | Name | Date |
|---|---|---|
| 1,840,609 | Slidell | Jan. 12, 1932 |
| 1,952,757 | Higgins | Mar. 27, 1934 |
| 1,960,573 | Butterworth et al. | May 29, 1934 |